(12) United States Patent
O'Sullivan et al.

(10) Patent No.: US 10,375,128 B2
(45) Date of Patent: *Aug. 6, 2019

(54) ORGANIZING A SYNCHRONOUS COMMUNICATION SESSION ACCORDING TO CONTEXT

(71) Applicant: International Business Machines Corporation, Armonk, NY (US)

(72) Inventors: Owen O'Sullivan, Dublin (IE); Fernando J. Salazar, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 954 days.

This patent is subject to a terminal disclaimer.

(21) Appl. No.: 14/036,139

(22) Filed: Sep. 25, 2013

(65) Prior Publication Data

US 2015/0074551 A1    Mar. 12, 2015

Related U.S. Application Data

(63) Continuation of application No. 14/024,709, filed on Sep. 12, 2013.

(51) Int. Cl.
*H04L 29/06* (2006.01)
(52) U.S. Cl.
CPC ........ *H04L 65/403* (2013.01); *H04L 65/1069* (2013.01)

(58) Field of Classification Search
CPC .................................................. H04L 29/06
See application file for complete search history.

(56) References Cited

U.S. PATENT DOCUMENTS

| 6,300,936 B1* | 10/2001 | Braun ................ G05B 19/00 345/156 |
| 7,797,293 B2 | 9/2010 | Pabla et al. |
| 8,095,882 B2 | 1/2012 | Kashi |
| 8,832,190 B1* | 9/2014 | Leske ................ H04L 12/1822 709/204 |
| 2009/0289779 A1* | 11/2009 | Braun ................ G06F 3/016 340/407.2 |
| 2011/0314399 A1* | 12/2011 | Sangster ............ G06F 9/4443 715/767 |
| 2011/0314405 A1* | 12/2011 | Turner ................ G06F 3/0238 715/773 |
| 2012/0221952 A1* | 8/2012 | Chavez ................ G06Q 10/00 715/733 |

(Continued)

*Primary Examiner* — David E Choi
(74) *Attorney, Agent, or Firm* — Cuenot, Forsythe & Kim, LLC

(57) ABSTRACT

Organizing a synchronous communication session can include determining, using a processor of a data processing system, a context responsive to detecting a trigger event. The context specifies a foreground application executing within the data processing system. Candidate participants can be determined from the context. A user interface is displayed separate from the foreground application. The user interface lists the candidate participants. Further, responsive to a user input received within the user interface, an invite to the candidate participants is sent. The invite specifies access information for the synchronous communication session.

9 Claims, 3 Drawing Sheets

(56) References Cited

U.S. PATENT DOCUMENTS

| | | | |
|---|---|---|---|
| 2012/0222069 A1* | 8/2012 | Chavez | H04N 7/147 725/37 |
| 2012/0222135 A1* | 8/2012 | Chavez | H04N 21/4104 726/29 |
| 2012/0230484 A1 | 9/2012 | Kannappan et al. | |
| 2012/0265528 A1 | 10/2012 | Gruber et al. | |
| 2013/0031185 A1* | 1/2013 | Wyatt | G06Q 10/107 709/206 |
| 2015/0074192 A1* | 3/2015 | O'Sullivan | H04L 65/1069 709/204 |
| 2015/0074551 A1* | 3/2015 | O'Sullivan | H04L 65/1069 715/753 |
| 2015/0160817 A1* | 6/2015 | Hwang | G06F 17/30905 715/785 |

* cited by examiner

ORGANIZING A SYNCHRONOUS COMMUNICATION SESSION ACCORDING TO CONTEXT

CROSS-REFERENCE TO RELATED APPLICATIONS

This application is a continuation of application Ser. No. 14/024,709, filed on Sep. 12, 2013, which is fully incorporated herein by reference.

BACKGROUND

Within modern work environments, users are required to interact with many different persons on a daily basis. Often, the persons with whom one must interact are not geographically co-located. As such, users must rely upon various communication technologies to facilitate interactions. The particular type of communication technology used may be either synchronous or non-synchronous. Examples of synchronous communications include instant messaging, text messaging, online meetings, traditional telephony, voice over Internet Protocol (VoIP), video chat, and teleconferencing. Examples of non-synchronous communications include electronic mail and discussion boards.

Synchronous communications are technologies that offer real time and potentially concurrent exchange of data or communications between the participants. Non-synchronous communications are not real time and communications are not concurrently bi-directional or conversational in nature. Synchronous communications provide various advantages over non-synchronous communications including, for example, increased efficiency, immediacy, and timeliness to the participant interactions. In order to preserve these benefits, however, a synchronous communication session must be organized between the participants without placing an undue burden upon any one participant.

BRIEF SUMMARY

This specification relates to organizing a synchronous communication session according to context.

A method includes determining, using a processor of a data processing system, a context responsive to detecting a trigger event. The context specifies a foreground application executing within the data processing system. The method further includes determining candidate participants from the context and displaying a user interface separate from the foreground application, wherein the user interface lists the candidate participants. Responsive to a user input received within the user interface, sending an invite to the candidate participants. The invite specifies access information for a synchronous communication session.

A system includes a display device and a processor coupled to the display device. The processor is programmed to initiate executable operations. The executable operations include determining a context responsive to detecting a trigger event. The context specifies a foreground application executing within a data processing system including the processor. The executable operations also include determining candidate participants from the context and displaying upon the display device a user interface separate from the foreground application, wherein the user interface lists the candidate participants. Responsive to a user input received within the user interface, an invite is sent to the candidate participants. The invite specifies access information for a synchronous communication session.

A computer program product includes a computer readable storage medium having program code stored thereon. The program code is executable by a processor to perform a method. The method includes determining, using the processor of a data processing system, a context responsive to detecting a trigger event. The context specifies a foreground application executing within the data processing system. The method also includes determining, using the processor, candidate participants from the context and displaying, using the processor, a user interface separate from the foreground application upon a display device. The user interface lists the candidate participants. The method further includes, responsive to a user input received within the user interface, sending, using the processor, an invite to the candidate participants, wherein the invite specifies access information for a synchronous communication session.

DETAILED DESCRIPTION

Figure 1:
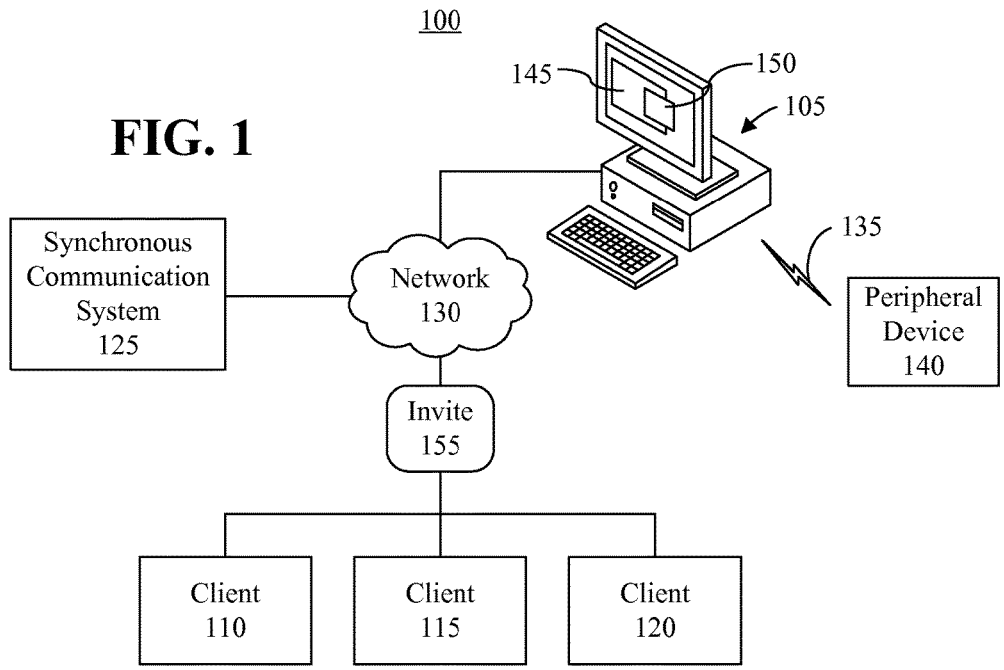
FIG. 1 is a block diagram illustrating an exemplary network system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. As defined herein, the term "computer-readable storage medium" means a tangible storage medium that contains or stores program code for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

This specification relates to synchronous communications and, more particularly, to organizing a synchronous communication session according to context. In accordance with the inventive arrangements disclosed within this specification, the context in which a user is working can be determined. In one aspect, the context is determined responsive to a trigger event. In general, detection of the trigger event serves as an indication that the user wishes to communicate with one or more other users having a relationship to activities being performed by the user as reflected in the context.

From the context, one or more candidate participants for a synchronous communication session are determined. Further, a presence, or presence information, for each candidate participant may be determined. Accordingly, a user can be presented with a user interface (UI) that includes a list of the candidate participants determined from the context in which the user is working Presence for the candidate participants can be presented through the UI. Using the UI and the information presented therein, the user may select a particular type of synchronous communication channel over which to establish the synchronous communication session. Responsive to one or more user inputs from the user, a synchronous communication session may be setup and/or established. Further, invites to join the synchronous communication session can be sent to the candidate participants or selected candidate participants as the case may be.

As used herein, a "synchronous communication channel" refers to a communication technology that offers real time and concurrent exchange of data or communications between the participants. Examples of synchronous communication channels include, but are not limited to, instant messaging, text messaging, online meetings, traditional telephony, voice over Internet Protocol (VoIP), video chat, online screen sharing, and teleconferencing. A "synchronous communication session" refers to a semi-permanent interactive information exchange conducted over a selected synchronous communication channel. The phrase "real time" means a level of processing responsiveness that a user or system senses as sufficiently immediate for a particular process or determination to be made, or that enables the processor to keep up with some external process.

FIG. 1 is a block diagram illustrating an exemplary network system 100. Network system 100 includes a plurality of clients 105, 110, 115, and 120. Network system 100 further can include a synchronous communication system 125. Each of client systems 105, 110, 115, and 120 and synchronous communication system 125 can be implemented as a data processing system. Synchronous communication system 125 may be implemented as a plurality of inter-connected data processing systems or servers.

Synchronous communication system 125 can communicate with, and support, synchronous communications between clients 105, 110, 115, and 120 over network 130. For example, synchronous communication system 125 can implement or host a synchronous communication session that can be joined by one or more or all of clients 105, 110, 115, and/or 120.

Network 130 is the medium used to provide communications links between various devices illustrated in network system 100. Network 130 may include connections, such as wire, wireless communication links, or fiber optic cables. Network 130 can be implemented as, or include, any of a variety of different communication technologies such as a WAN, a LAN, a wireless network, a mobile network, a Virtual Private Network (VPN), the Internet, the Public Switched Telephone Network (PSTN), or the like.

In the example pictured in FIG. 1, each of clients 105, 110, 115, and 120 can be operated by a user. The term "user" means a human being that is operating and/or accessing a particular client. Each of clients 105-120 can be said to be "associated" with the particular user that is operating the client. Within this specification, a reference to a particular user may also refer to the client associated with, or used by, that user. Similarly, reference to a particular client may also refer to the user associated with that client. For example, reference to client 105 may also refer to the user of client 105. For purposes of discussion, user 105 is the user of client 105. Similarly, user 110 is the user of client 110, etc.

As pictured, client 105 is communicatively linked through a wireless communication link 135 to a peripheral device 140. In one aspect, wireless communication link 135 can be a near field wireless communication link such as, for example, one that is compliant with Bluetooth® Core Version 4.0, an earlier version of the specification, an as of yet unreleased implementation of the specification, an 802.11 type wireless connection, or the like. While illustrated as wireless communication link 135, it should be appreciated that peripheral device 140 may be communicatively linked to client 105 by way of a physical connection such as a cable, e.g., universal serial bus (USB), firewire, or the like.

In one aspect, peripheral device 140 can include one or more transducive elements such as a speaker and/or a microphone. Accordingly, a user of client 105 may listen and speak through peripheral device 140 when participating in a synchronous communication session. In one example, peripheral device 140 is implemented as a wearable peripheral device. A wearable peripheral device is one that the user must put on or "don." Such a peripheral device, for example, is worn on a part of the user's body, attached to the user's clothing, or the like. Examples of wearable peripheral devices can include earpieces and/or headsets. Another example of a wearable peripheral device includes a wrist worn combination of one or more of the aforementioned transducive elements. Still, peripheral device 140 can be one that is intended to be held as opposed to one that is wearable.

In another aspect, peripheral device 140 can include a motion sensor. One example of a motion sensor is an accelerometer. Inclusion of a motion sensor allows peripheral device 140 to generate a signal or other indication responsive to being moved or responsive to detecting a particular type of motion or movement. For example, peripheral device 140 can be configured to send a signal recognized as a trigger event by client 105 responsive to a user putting on or donning, or picking up peripheral device 140. The trigger event is sent from peripheral device 140 to client 105.

Consider the case where user 105 is working using client 105. Accordingly, client 105 includes an execution environment in which one or more different applications are executed. While working, user 105 puts on a headset, e.g., peripheral device 140. Movement of peripheral device 140 and, more particularly, the act of user 105 donning peripheral device 140, is detected through the use of the motion sensor contained therein. Accordingly, peripheral device 140 sends a trigger event to client 105 responsive to the detected movement.

While the trigger event may be a physical movement of an object that is physically separate and independent from client 105, it should be appreciated that the trigger event can be any of a variety of different inputs from user 105. For example, other trigger events can include, but are not limited to, user input selecting one or more keys, e.g., a key combination, a user spoken utterance, or the like.

Responsive to the trigger event, client 105 determines which of the applications executing therein is currently active or has "focus." The application that is "in focus" is said to be in the foreground and may be referred to as the "foreground application." In this example, application 145 is the foreground application when the trigger event is detected. Client 105 determines a context specifying information for application 145. From the determined context, client 105 further determines one or more candidate participants for a synchronous communication session that may be established. In one aspect, client 105 can determine the availability of each such candidate participant and present a UI 150 to user 105 listing the candidate participants and providing a means by which user 105 can initiate the synchronous communication session with each such candidate participant.

UI 150 can be independent or separate from application 145. As illustrated in FIG. 1, UI 150 is displayed as a window that is separate and distinct from the window corresponding to application 145. From UI 150, user 105 can initiate a synchronous communication session with one or more of the listed candidate participants. For example, user 105 can select a control within UI 150 that causes a synchronous communication session to be setup or established within and/or by synchronous communication system 125. Further, user 105 can select a control within UI 150, e.g., the same control and/or a different control, thereby causing an invite 155 to be sent to users 110, 115, and 120. In this example, users 110, 115, and 120, corresponding to clients 110, 115, and 120, respectively, are candidate participants for the synchronous communication session since users 110, 115, and 120 were determined from the aforementioned context.

Presentation of candidate participants within UI 150 streamlines the process of organizing a synchronous communication session. The context that is derived is presumed to be instructive of the particular issue that user 105 is attempting to resolve. Further, the context is presumed to be instructive of the particular candidate participants, e.g., users 110, 115, and/or 120, who may be needed for participation within the synchronous communication session in order for user 105 to resolve the issue.

Typically, while working in an application such as a browser application and/or a productivity application, the names of candidate participants or other actionable elements that allow candidate participants to be determined are linked or listed within the particular digital asset that is open within the application. Thus, in order to resolve an issue while working, it is often the case that user 105 would like to start a synchronous communication session with one or more candidate participants that may be discernible from the context within client 105 that exists when a trigger event is detected. The context of client 105 includes, for example, the foreground application. The context further can include any digital asset open therein or currently being displayed by the foreground application. The embodiments described herein provide for the seamless organization and/or initiation of a synchronous communication session based upon such context. Accordingly, for purposes of illustration, consider the following exemplary situations where user 105 may find it desirable to initiate a synchronous communication session with candidate participants determined from context of client 105.

In one example, while reading an electronic mail, user 105 decides that more immediate communication with the sender and/or one or more other recipients of the electronic mail is required. Responsive to user 105 placing an earpiece, e.g., peripheral device 140, on his or her ear, UI 150 is displayed presenting a list of candidate participants. In this example, each person that received the electronic mail is a candidate participant. UI 150 further can include one or more controls that allow user 105 to send invite 155 to each listed candidate participant inviting that candidate participant to participate in a conference call hosted by synchronous communication system 125. As noted, presence for each candidate participant, e.g., online presence information which can include availability as determined by a calendar or other schedule, also can be displayed if available.

In another example, while browsing a project status Web page rendered in a browser application, user 105 decides that an online meeting is needed for one or more of the persons named on the Web page currently being viewed. Such persons are considered candidate participants in this example. Responsive to user 105 selecting a hotkey, UI 150 is displayed. UI 150 includes a list of the candidate participants that were listed on the Web page. As noted, presence may be displayed for each candidate participants if available. Through UI 150, the online meeting is established, or activated within synchronous communication system 125. Further, responsive to user inputs provided to UI 150, selected ones of the candidate participants listed in UI 150 receive invite 155 to the online meeting. It should be appreciated that the trigger event in this example also may be the donning of peripheral device 140.

Invite 155 can be sent via instant message, electronic mail, short message service (SMS), or the like. Alternatively, invite 155 can be sent to selected candidate participants via a phone call. For example, an interactive voice response system can place a call to each selected candidate participant and provide information needed by the candidate participant to join the synchronous communication session. Thus, invite 155 can be sent via a different communication channel than is used for the synchronous communication session. Further, the communication channel over which invite 155 is sent need not be synchronous, e.g., where electronic mail is used.

In still another example, while operating a productivity application such as a word processing application, user 105 determines that a review of the document currently being edited or viewed is required. Responsive to user 105 donning an earpiece, UI 150 is presented. UI 150, for example, can display a thumbnail image of the current document and summary information. In one aspect, the candidate participants associated with the document are listed in UI 150. In another aspect, using a voice-driven lookup service, user 105 creates a list of names within UI 150. In either case, user 105 can invoke a command via UI 150 that causes invite 155 to be sent to the selected candidate participants. Invite 155 can invite the selected candidate participants to a conference call and to an online sharing session where the document being viewed by user 105 is displayed for purposes of discussion. The conference call and the online sharing session can be hosted or facilitated by synchronous communication system 125.

In another aspect, the clients that receive invite 155 as described in the examples above may also store prior contexts that can be retrieved. For example, responsive to user 110 and client 110 receiving invite 155 from user 105, one or more contexts may be retrieved and presented by client 110 to user 110. Each context that is retrieved and presented by way of client 110 can be one that existed concurrently or during a prior communication session between user 110 and user 105. The list of contexts presented can specify information such as a particular Web page, document, or the like that was viewed and/or the subject of a prior communication whether a synchronous communication session or a non-synchronous communication session between users 105 and 110. As such, the candidate participants that receive invite 155 may retrieve likely contexts and/or reasons for the particular invite that is received. The retrieved contexts for user 110, however, can be filtered or limited to only those involving user 105, e.g., communication with user 105.

Figure 2:
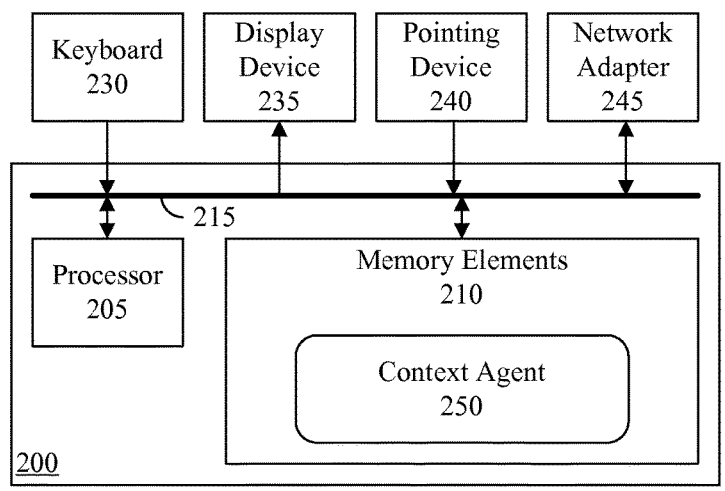
FIG. 2 is a block diagram illustrating an exemplary architecture for a data processing system.

FIG. 2 is a block diagram illustrating an exemplary architecture for a data processing system (system) 200. The architecture pictured in FIG. 2 can be used to implement any of clients 105, 110, 115, and/or 120 of FIG. 1. Further, the architecture pictured in FIG. 2 can be used to implement one or more servers of synchronous communication system 125 of FIG. 1.

As pictured, system 200 can include at least one processor 205, e.g., a central processing unit, coupled to memory elements 210 through a system bus 215 or other suitable circuitry. System 200 can store program code within memory elements 210. As illustrated, system 200 stores a context agent 250 within memory elements 210. Processor 205 executes the program code accessed from memory elements 210 via system bus 215 or the other suitable circuitry.

In one aspect, system 200 is implemented as a computer or other programmable data processing apparatus that is suitable for storing and/or executing program code. It should be appreciated, however, that system 200 can be implemented in the form of any system including a processor and memory that is capable of performing and/or initiating the functions and/or operations described within this specification.

Memory elements 210 include one or more physical memory devices such as, for example, local memory and one or more bulk storage devices. Local memory refers to RAM or other non-persistent memory device(s) generally used during actual execution of the program code. A bulk storage device can be implemented as an HDD, SSD, or other persistent data storage device. System 200 also can include one or more cache memories (not shown) that provide temporary storage of at least some program code in order to reduce the number of times program code must be retrieved from a bulk storage device and/or RAM during execution.

Input/output (I/O) devices such as a keyboard 230, a display device 235, and a pointing device 240 optionally can be coupled to system 200. The I/O devices can be coupled to system 200 either directly or through intervening I/O controllers. One or more network adapters 245 also can be coupled to system 200 to enable system 200 to become coupled to other systems, computer systems, remote printers, and/or remote storage devices through intervening private or public networks. Modems, cable modems, wireless transceivers, and Ethernet cards are examples of different types of network adapters 245 that can be used with system 200. Peripheral device 140 of FIG. 1, for example, whether wired or wireless, can communicate with system 200 via network adapter 245.

System 200 can be implemented in any of a variety of different form factors. As a server, for example, system 200 may or may not include I/O devices such as keyboard 230, display 235, and/or pointing device 240. As a client, system 200 can be implemented as a personal computer, a portable computer, e.g., a laptop, a tablet, a mobile communication device, or the like. For example, system 200 can include I/O devices such as keyboard 230, display device 235, and pointing device 240 in any of a variety of different configurations, e.g., as an integrated display device in the form of a flat panel display or touchscreen that replaces keyboard 230 and/or pointing device 240, etc.

As noted, memory elements 210 can store program code that includes context agent 250 and an operating system (not shown). In the case of a client, context agent 250, when executed, causes system 200 to perform the various operations described within this specification. It should be appreciated that context agent 250, including any parameters and/or attributes utilized by context agent 250, i.e., a context, digital assets, etc., are functional data structures that impart functionality when employed as part of system 200.

Figure 3:
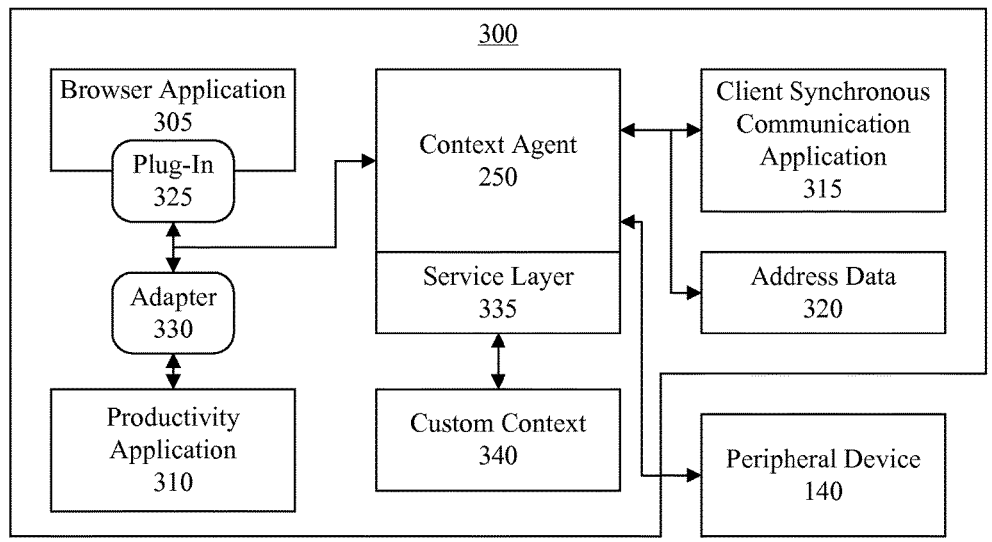
FIG. 3 is a block diagram illustrating an exemplary execution environment including a context agent.

FIG. 3 is a block diagram illustrating an exemplary execution environment 300 including a context agent. Execution environment 300 is representative of the execution environment implemented, or existing, within client 105 of FIG. 1. As shown, execution environment 300 includes a context agent 250, a browser application 305, a productivity application 310, a client synchronous communication (CSC) application 315, and address data 320. Peripheral device 140, which is a physical device not part of execution environment 300, also is shown for purposes of illustration and description.

In one aspect, context agent 250 is implemented as a continually resident program and is configured to perform a variety of different functions. Context agent 250 monitors activity within the client to determine a current context for the client. As part of the monitoring activity, context agent 250 continually tracks and/or determines the particular application that is executing within the client as the foreground application. Additional details such as the digital asset that is open or displayed within the foreground application also can be determined as part of the context. A digital asset refers to a file that may be opened by the foreground application. Still, other details relating to operation of the client can be determined as part of the context.

The way in which context agent 250 determines context can vary. In one aspect, context agent 250 communicates with the foreground application by way of a plug-in. As an illustrative example, context agent 250 communicates with browser application 305 through plug-in 325. Plug-in 325 executes and interacts with browser application 305 using the standard application programming interfaces (APIs) provided by browser application 305.

In the case of browser application 305, the digital asset may be a Web page. When a user opens and/or views a Web page within browser application 305, for example, browser application 305 is the foreground application. The phrase "Web page," as used herein, can refer to any of a variety of markup-language documents and/or other documents that can be displayed or rendered by browser application 305. Accordingly, context agent 250 is aware that browser application 305 is the foreground application and further is aware of the particular digital asset that is being viewed or rendered therein. In this regard, context agent 250 has access to the digital asset, e.g., the Web page, rendered within browser application 305 through plug-in 325. The digital asset may be parsed or otherwise evaluated by context agent 250.

Context agent 250 also can communicate with an application by way of an adapter. For example, context agent 250 communicates with productivity application 310 through adapter 330. Adapter 330 is an interface component that reads context from productivity application 310 through the applicable APIs provided by productivity application 310. Adapter 330 communicates context for productivity application 310 to context agent 250. When a user opens and/or views a digital asset such as an electronic mail, a word processing document, a spread sheet, a presentation, a drawing, etc., through productivity application 310, context agent 250 is aware that productivity application 310 is the foreground application. Further, the digital asset opened within productivity application 310 is made available to context agent 250 by adapter 330.

In still another aspect, an application can communicate with context agent 250 through a service layer 335 thereby supporting custom contexts. Browser application 305 and productivity application 310 are examples where integration with context agent 250 is achieved after the fact. In those cases, integration is achieved through the use of the various extensibility services provided by each respective application. Custom context 340, however, illustrates an example in which the application is built with specific knowledge of context agent 250. As such, custom context 340 utilizes APIs of context agent 250 as accessed through service layer 335 to communicate a context.

CSC application 315 represents any of a variety of synchronous communication applications that may be executed within a client. For example, CSC application 315 can establish synchronous communication sessions over any of a variety of available synchronous communication channels. As noted, examples of synchronous communication channels include, but are not limited to, instant messaging, text messaging, VOIP, conventional telephone, online web meetings including content sharing, teleconferences, or the like. In one aspect, CSC application 315 can be implemented as a stand-alone application, e.g., an interactive desktop application, having a dedicated UI. In another aspect, however, CSC application 315 can be implemented as a resident service capable of performing the aforementioned operations under control of context agent 250 without providing a UI. Further examples of CSC application 315 include, but are not limited to, an XMPP client, a multiprotocol client, a federated client, or the like.

As pictured in FIG. 3, context agent 250 can communicate with peripheral device 140. As such, any trigger events generated and sent from peripheral device 140 to the client are received and processed by context agent 250. As noted, context agent 250 can perform various operations responsive to a received trigger event from peripheral device 140. Context agent 250 can establish or initiate a synchronous communication session based upon the context in existence when the trigger event is received from peripheral device 140.

Address data 320 is a data structure stored within a computer-readable storage medium within the client that stores identifying information for contacts. For example, address data 320 includes one or more contact entries. Each entry can include a name and one or more correlated or associated addresses for the name. Each address may be associated with, or used for, establishing a communication session with the contact. For example, a given entry may specify a name, an instant messaging address, an electronic mail address, an address for a telephone call (e.g., a phone number), or the like. Address data 320 further supports querying and lookup operations according to any of a variety of different search attributes. For example, address date 320 can be queried using a name so that one or more addresses can be retrieved. In another example, an address can be used to retrieve a name and/or additional addresses for a user. Address data 320 may be integrated within CSC application 315, but this need not be the case. The various embodiments disclosed within this specification effectively integrate synchronous communications with a wide range of applications without the need for modifying those applications.

In conventional approaches, to the extent that synchronous communications are made accessible, such is the case through a real time communications API that must be used and incorporated into each application by the developer. For example, in the case of a Web page the developer or owner of the Web page must modify the Web page (or other application as the case may be) to utilize the real time API. Incorporation of the real time API, however, introduces into the application an unwelcome level of complexity and a dependency upon foreign program code in reference to the API being developed by a third party. Further, integration of the API must be performed for each application for which synchronous communications are to be made accessible.

Typically, while working in an application such as browser application 305 and/or productivity application 310, the names or other actionable elements that allow the names of contacts to be determined are linked or listed within the particular digital asset that is open within the foreground application. Thus, when attempting to resolve an issue while working, it is often the case that the user would like to quickly start a synchronous communication session with one or more of the persons named in the foreground application without having to leave that context, e.g., application, to do so. The embodiments described herein accomplish the seamless organization and/or initiation of such synchronous communication sessions and, in addition, facilitate multi-party versions of synchronous communication sessions.

Figure 4:
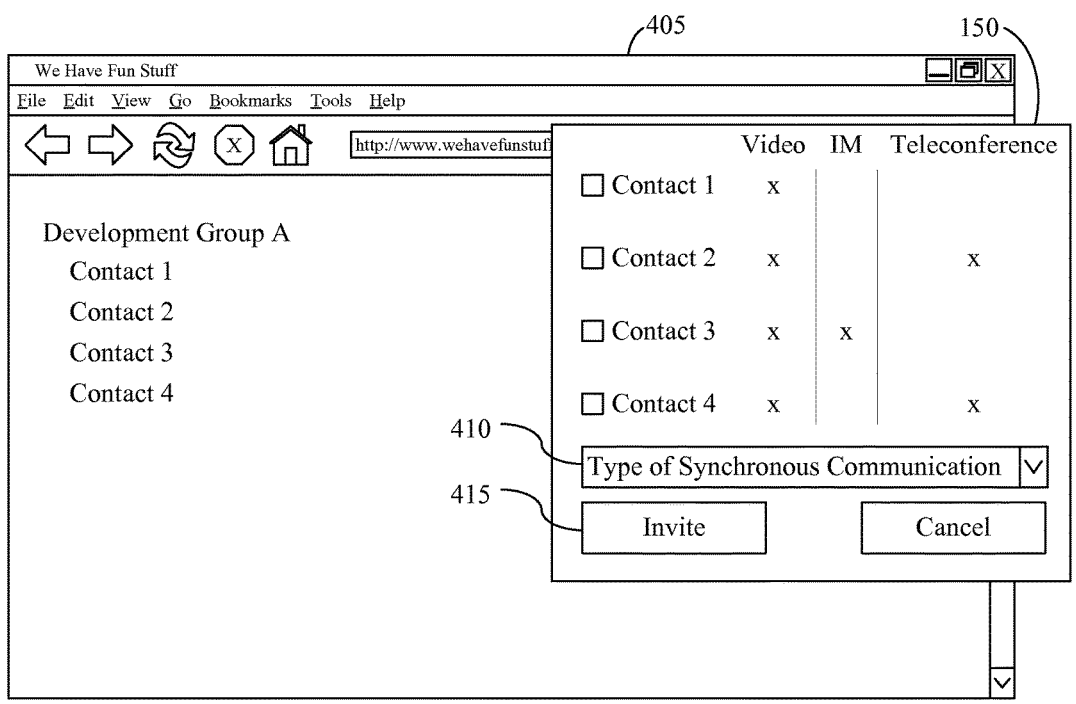
FIG. 4 is a block diagram illustrating an exemplary user interface for the context agent of FIG. 3.

FIG. 4 is a block diagram illustrating an exemplary UI for the context agent of FIG. 3. FIG. 4 illustrates a UI 405 for browser application 305. Further, UI 150 of context agent 250 is presented. In the example shown, a trigger event has been detected by context agent 250. Accordingly, a context has been determined from browser application 305.

As shown, the digital asset opened within browser application 305 lists a plurality of contacts shown as "contact 1," "contact 2," "contact 3," and "contact 4." Context agent 250 processes the received digital asset and identifies contacts 1, 2, 3, and 4 from the digital asset. In another example, address data 320 can be used to determine contacts 1, 2, 3, and 4 from the detected phrase "Development Group A." For example, address data 320 can include an organizational chart indicating that contacts 1, 2, 3, and 4 are members of Development Group A. Accordingly, even if the digital asset opened within browser application 305 did not explicitly list contacts 1, 2, 3, and 4, context agent 250 may determine contacts 1, 2, 3, and 4 from address data 320 from looking up "Development Group A". From the context, a list of candidate participants including "contact 1," "contact 2," "contact 3," and "contact 4" is presented within UI 150.

Thus, responsive to a trigger event, a context is determined by context agent 250. The context specifies that browser application 305 is the foreground or in focus application. The context further specifies the particular Web page rendered within browser application 305. As noted, whether by custom context, plug-in, or adapter, the actual Web page is available to context agent 250. Accordingly, context agent 250 can parse the Web page to identify any names for any contacts listed therein. Further, addresses for each contact can be determined by context agent 250 from address data 320.

In the example shown in FIG. 4, presence information for each contact is shown thereby indicating the particular communication channel(s) over which each candidate participant is available. The user that caused the detected trigger event, e.g., user 105 of client 105, may select which of the listed candidate participants are to receive an invite for a synchronous communication session. In the example shown in FIG. 4, the user selects contact by checking the appropriate checkbox control. Further, the user is able to select the particular type of synchronous communication session that is to be established using control 410.

While the user is provided with the ability to select a particular type of synchronous communication session that is to be established, in another aspect, the choice of the particular type of synchronous communication session to be established is made automatically by context agent 250. For example, context agent 250 can determine or identify each candidate participant in the list presented in UI 150 that is selected by the user. Context agent 250 then can select a particular type of synchronous communication session for which each selected candidate participant is available per the presence information. In cases where the selected candidate participants may participate in more than one different type of synchronous communication session, context agent 250 may select a particular type of synchronous communication session according to a prioritized list that may be specified by the user.

Once the user has selected candidate participants from UI 150 and a type of synchronous communication session has been determined, the user may select control 415. Responsive to a user selection of control 415, context agent 250 communicates with synchronous communication system 125 to set up and/or establish a synchronous communication session of the type selected if applicable. In another example, context agent can instruct CSC application 315 to setup and/or establish a synchronous communication session of the type selected if applicable.

Further, context agent 250 sends an invite to each selected contact or instructs CSC application 315 to send such an invite. The invite that is sent includes any information necessary for the recipient of the invite to join the synchronous communication session established within synchronous communication system 125. For example, the invite can include hyperlinks, teleconference numbers, passcodes, or the like as may be required depending on the type of synchronous communication session that is established.

It should be appreciated that the particular implementation of UI 150 may vary and is not intended to be limited by the example provided. Those skilled in the art will recognize that the information contained within UI 150 can be presented using any of a variety of different visualization techniques and that the controls shown may vary depending upon preference.

Figure 5:
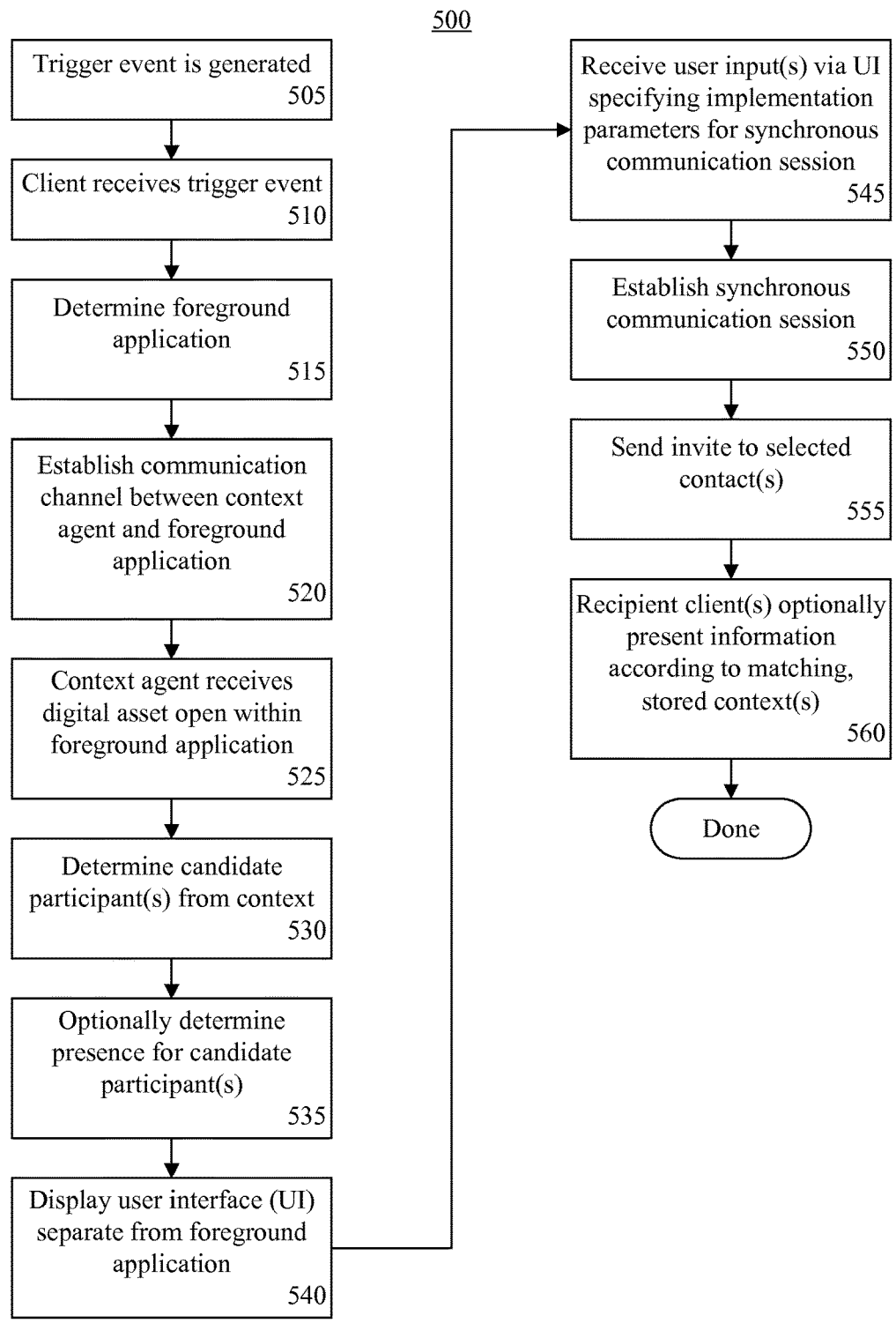
FIG. 5 is a flow chart illustrating an exemplary method of organizing a synchronous communication session.

FIG. 5 is a flow chart illustrating an exemplary method 500 of organizing a synchronous communication session. Method 500 can be performed by a client executing a context agent as described within this specification. For example, method 500 may be performed by client 105.

In block 505, a trigger event is generated. In one aspect, the trigger event is a user input specifying one or more predetermined keys, a selection of a graphical UI element or control, a particular user spoken utterance interpreted as a trigger event, or the like. In another aspect, the trigger event is the act of a user putting on a peripheral device and/or picking up a peripheral device as may be detected using a motion detector within the peripheral device.

In block 510, the client and, more particularly, the context agent, receives the trigger event. In block 515, responsive to the trigger event, the client determines the foreground application. For example, the context agent executing within the client may determine that a productivity application or a browser is the foregoing application.

In block 520, a communication channel is established between the context agent and the foreground application. Communication between the context agent and the foreground application can be facilitated by a custom programming solution, an adapter, and/or a plug-in as previously described. In one aspect, for example, the context agent establishes an inter-process communication (IPC) channel with the foreground application. For example, the context agent can open an IPC channel with the plug-in of the browser application. The IPC channel can be implemented as a TCP/IP socket, a named pipe, shared memory, or another standard operating system capability.

In block 525, the context agent receives a digital asset that is open within the foreground application. The digital asset is received by the context agent over the established communication channel. For example, when the foreground application is a browser application, the digital asset can be a Web page. When the foreground application is a productivity application, the digital asset can be a word processing document, a spreadsheet, a presentation, an electronic mail, a drawing, or the like. In any case, the digital asset can include content and metadata such as the author, owner, responsible party or group, etc.

The context agent can receive the digital asset in any of a variety of different formats. In one example, the context agent can receive the digital asset in its native form or file format. Other exemplary forms in which the digital asset can be provided and received by the context agent can include, but are not limited to, document object model (DOM) form, raw text, or the like. In cases where the digital asset is received as raw text, the context agent may convert or parse the raw text of the digital asset to create a DOM representation of the digital asset.

Accordingly, the context determined by the context agent includes the foreground application. The context determined by the context agent further may include the digital asset that is open within the foreground application. The context determined by the context agent, however, can include additional information. As another example, the context agent can determined, as part of the context, whether the digital asset was obtained from an intranet site or another site that is accessible by the public, e.g., not restricted or limited to particular segments or members of the public.

In block 530, the context agent determines one or more candidate participants from the context. In one aspect, the context agent analyzes, e.g., parses, the received digital asset to identify names, addresses, and/or other actionable items contained therein. For example, the DOM of the digital asset can be evaluated whether the digital asset is a Web page, a word processing document, a spreadsheet, or any of the other examples already discussed to identify tags, names, addresses, or other actionable items such as particular attributes, etc., contained therein. As noted, candidate participants can be determined from the actual content of the digital asset as well as from the metadata of the digital asset. The content of the digital asset includes the portions of the digital asset that are viewable within the foreground application.

It should be appreciated that the context agent can perform any of a variety of different searches against the address data using any actionable items of information obtained from the context to determine candidate participants. Further, the particular type(s) of searches conducted can vary according to the type of the foreground application and/or the particular type of digital asset that is being evaluated. Exemplary searches that can be conducted by the context agent can include scanning for electronic mail addresses, scanning for tags associated with names and/or addresses, scanning for names, etc. Further, the manner in which the search is conducted can vary. In some cases, for example, the search can be conducted against a cached version of the digital asset. In other cases, the search can be limited to locating actionable data items that are visible by an end user when the digital asset is rendered within the foreground application.

As previously noted, having determined one or more actionable data items, address data can be accessed by the context agent. The address data can be used to determine addresses for located names, determine names for located addresses, determine alternate addresses for located names and/or addresses, etc. Since the address data may include an organizational chart, hierarchical data for an organization, role data, etc., the context agent also may determine one or more candidate participants from an actionable data item such as a group name or role found from the context.

In block 535, the context agent can determine a presence for each candidate participant determined in block 530. For example, the context agent can determine presence for candidate participants from the CSC application, or more than one such application, also executing within the client. In another aspect, the presence of a candidate participant includes availability of the candidate participant as may be determined from a calendar for the candidate participant. In any case, any determined addresses and/or names for each candidate participant can be sent to the CSC application(s) and/or calendaring system as a request for presence data for the addresses and/or names as the case may be. Presence data is then provided back to the context agent in response to the request(s).

In block 540, the context agent displays a UI. The UI that is displayed can be separate from the foreground application. More particularly, the UI can be a separate window from the window containing the foreground application. The UI can include a list of the candidate participants determined from the aforementioned evaluation of the context. Within the UI, the context agent further can present the presence for each listed candidate participant. Notwithstanding the prior described UI example of FIG. 4, further examples of how presence may be specified within the UI for a candidate participant include, but are not limited to, "available," "in a meeting," "Offline," or the like.

In block 545, the context agent receives one or more user inputs through the displayed UI. The received user input(s) can specify one or more implementation parameters for the synchronous communication session to be established. For example, the user input(s) can select one or more candidate participants that are to receive an invite and participate in the synchronous communication session. The user input(s) further can select a particular synchronous communication channel over which the synchronous communication session is to be conducted. In another example, the user input(s) can specify a communication channel over which the invite to the synchronous communication session are to be sent.

As discussed, however, the context agent can automatically select the particular synchronous communication channel to be used for the synchronous communication session. Regardless of whether the user or the context agent selects the synchronous communication channel, the options can be limited to those available within the CSC application(s) that are executing, may be executing, and accessible by the context agent within the client.

In block 550, a synchronous communication session is established or setup. For example, the context agent can communicate with the CSC application and instruct the CSC application to establish a synchronous communication session with the relevant synchronous communication system. For example, the context agent can instruct the CSC application to arrange an online meeting, arrange a teleconference having a call in number and passcodes, arrange an online sharing session, etc. In some cases, the setup for a synchronous communication session may not be required. For example, a user may have a dedicated passcode and access to a teleconference number. Accordingly, block 550 can be skipped as the synchronous communication session remains available to the user and participants. Such functionality need not be setup in advance.

In block 555, an invite is sent to each contact selected from the list of candidate participants presented in the UI. In one aspect, the context agent instructs the CSC application to send an invite to each selected candidate participant. The invite can provide instructions such as hyperlinks, telephone numbers, passcodes, and/or the like for the receiving candidate participant to join the synchronous communication session. Once the invite is received, each recipient contact is able to follow the instructions provided and access the synchronous communication session. Further, the context agent of the organizing user can invoke the appropriate interface of the CSC application to start the specified synchronous communication session. Each client of a candidate participant may also have a context agent executing therein that can invoke or start the necessary CSC application(s). The context agent may or may not remain minimized during the described operations.

In block 560, the client(s) that receive the invite optionally perform one or more operations in response to receipt and/or acceptance of the invite. For example, responsive to receipt and/or acceptance of an invite as described, the client of the candidate participant(s) can search stored contexts for interactions between the candidate participant and the sender of the invite. Any stored context(s) that match one or more aspects of the current context can be recalled. For example, a prior stored context between the candidate participant and the sender of the invite can be said to match the current context and recalled. In another example, a matching context can be a prior stored context between the candidate participant and the sender of the invite in which the digital asset is also the same. As such, any aspects of the recalled context, e.g., the digital asset(s) previously discussed or shared, also can be recalled and made available to the candidate participant.

In accordance with the inventive arrangements disclosed herein, a user is able to initiate a synchronous communication session without leaving the user's current context. Further, the candidate participants of the synchronous communication session to be established are determined directly from the user's current context. By automatically monitoring the user's current context and determining the participants from the current context, the likelihood of including participants necessary or desirable for resolving an issue experienced by the user is increased.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer-implemented method within a computer hardware system, comprising: detecting, based upon an input received from a user, a trigger event; identifying, based upon the trigger event, a foreground application executing within the computer hardware system when the input was received; retrieving, from the identified foreground application, a digital asset displayed in the foreground application when the input was received, the digital asset including content and metadata; analyzing the content of the digital asset to identify a list of candidate participants; displaying, within a user interface separate from the foreground application, the list; and sending, to at least one of the candidate participants selected from within the user interface, an invite for a synchronous communication session, wherein the detecting, the identifying, the retrieving, the analyzing, and the displaying are performed by a context agent executing within the computer hardware system and separate from the foreground application.

2. The method of claim 1, wherein
the context agent is configured to communicate with the foreground application and receive the digital asset.

3. The method of claim 1, wherein
the context agent is configured to identify an availability of each of the candidate participants and display.

4. The method of claim 3, wherein
an availability of a particular candidate participant is displayed within the user interface.

5. The method of claim 3, wherein
the context agent is configured to select a particular type of synchronous communication session based upon availabilities of the candidate participants.

6. The method of claim 1, wherein
the trigger event is a detected movement of a peripheral device communicatively linked with the data processing system.

7. The method of claim 1, wherein
wherein the invite is sent only to each candidate participant selected within the user interface.

8. The method of claim 1, wherein
the user interface presents a plurality of different synchronous communication channels, and
the synchronous communication session is conducted over a synchronous communication channel selected from the plurality of different synchronous communication channels presented in the user interface.

9. The method of claim 1, wherein
the analyzing includes analyzing only portions of the digital asset that were viewable when the input was received.

\* \* \* \* \*